United States Patent
Levitan et al.

(10) Patent No.: US 10,552,159 B2
(45) Date of Patent: *Feb. 4, 2020

(54) POWER MANAGEMENT OF BRANCH PREDICTORS IN A COMPUTER PROCESSOR

(71) Applicant: International Business Machines Corporation, Armonk, NY (US)

(72) Inventors: David S. Levitan, Austin, TX (US); Nicholas R. Orzol, Austin, TX (US); Robert A. Philhower, Valley Cottage, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,682

(22) Filed: Jun. 1, 2018

(65) Prior Publication Data

US 2018/0275993 A1    Sep. 27, 2018

Related U.S. Application Data

(63) Continuation of application No. 15/220,986, filed on Jul. 27, 2016, now Pat. No. 10,037,207, which is a continuation of application No. 15/165,439, filed on May 26, 2016, now Pat. No. 9,996,351.

(51) Int. Cl.
*G06F 9/40* (2006.01)
*G06F 1/32* (2019.01)
(Continued)

(52) U.S. Cl.
CPC .......... *G06F 9/3848* (2013.01); *G06F 1/3243* (2013.01); *G06F 1/3287* (2013.01);
(Continued)

(58) Field of Classification Search
CPC ............ G06F 9/30058; G06F 9/30083; G06F 9/3806; G06F 9/3808; G06F 9/3842;
(Continued)

(56) References Cited

U.S. PATENT DOCUMENTS 6,108,776 A    8/2000  Check et al.
7,243,219 B2 *  7/2007  Jourdan ................ G06F 9/3848
                                                712/239

(Continued)

FOREIGN PATENT DOCUMENTS

WO    WO-2006/039183 A2    4/2006

OTHER PUBLICATIONS

Appendix P; List of IBM Patent or Applications Treated as Related, Oct. 24, 2018, 2 pages.

*Primary Examiner* — Daniel H Pan
(74) *Attorney, Agent, or Firm* — Nathan M. Rau (57) ABSTRACT

A computer processor includes a branch prediction unit that includes a local branch predictor and a global branch predictor. Managing power consumption in such a computer processor includes, for each of a plurality of branch instructions: performing, by the local branch predictor, a local branch prediction; performing, by each of the global branch predictors, a global branch prediction; determining to utilize the local branch prediction over the global branch predictions as a branch prediction for the branch instruction; incrementing a value of a counter; determining whether the value of the counter exceeds a predetermined threshold; and if the value of the counter exceeds the predetermined threshold, powering down at least one of the global branch predictors and configuring the branch prediction unit to bypass the powered down global branch predictor for branch predictions of subsequent branch instructions.

17 Claims, 6 Drawing Sheets

(51) Int. Cl.
*G06F 9/38* (2018.01)
*G06F 1/3234* (2019.01)
*G06F 1/3287* (2019.01)
*G06F 9/30* (2018.01)
*G06F 1/3246* (2019.01)
*G06F 1/3237* (2019.01)

(52) U.S. Cl.
CPC ...... *G06F 9/30058* (2013.01); *G06F 9/30083* (2013.01); *G06F 1/3237* (2013.01); *G06F 1/3246* (2013.01); *G06F 9/3806* (2013.01); *G06F 9/3808* (2013.01); *G06F 9/3842* (2013.01); *G06F 9/3844* (2013.01); *G06F 9/3846* (2013.01)

(58) Field of Classification Search
CPC .... G06F 9/3844; G06F 9/3846; G06F 9/3848; G06F 1/3243; G06F 1/3287; G06F 1/3237; G06F 1/3246; G06F 1/3203; G06F 1/328; Y02D 10/171; Y02D 10/152
USPC .......... 712/227, 235–240; 713/322, 323, 324
See application file for complete search history.

(56) References Cited

U.S. PATENT DOCUMENTS

| | | | |
|---|---|---|---|
| 8,578,141 B2* | 11/2013 | Jarvis | G06F 9/3806 712/241 |
| 9,032,191 B2 | 5/2015 | Muff et al. | |
| 9,996,351 B2* | 6/2018 | Levitan | G06F 1/3243 |
| 10,037,207 B2* | 7/2018 | Levitan | G06F 1/3243 |
| 2005/0066154 A1* | 3/2005 | Chung | G06F 9/3848 712/239 |
| 2008/0072024 A1* | 3/2008 | Davis | G06F 9/325 712/239 |
| 2009/0287912 A1* | 11/2009 | Sendag | G06F 9/3848 712/240 |
| 2012/0124393 A1* | 5/2012 | Sethumadhavan | G06F 21/76 713/190 |
| 2012/0311308 A1* | 12/2012 | Xekalakis | G06F 9/30145 712/239 |
| 2014/0156978 A1* | 6/2014 | Al-Otoom | G06F 9/3844 712/240 |
| 2015/0032997 A1* | 1/2015 | Eickemeyer | G06F 9/30058 712/206 |
| 2017/0344372 A1 | 11/2017 | Levitan et al. | |
| 2017/0344377 A1 | 11/2017 | Levitan et al. | |

* cited by examiner

POWER MANAGEMENT OF BRANCH PREDICTORS IN A COMPUTER PROCESSOR

CROSS-REFERENCE TO RELATED APPLICATIONS

This application is a continuation application of and claims priority from U.S. patent application Ser. No. 15/220,986, filed Jul. 27, 2016, which is a continuation application of and claims priority from U.S. patent application Ser. No. 15/165,439, filed May 26, 2016.

BACKGROUND

Field of the Invention

The field of the present disclosure is data processing, or, more specifically, methods, apparatus, and computer processors configured for power management.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors. Branch prediction is one form of increasing speed of operation in computer processors, but such branch prediction also consumes additional power.

SUMMARY

Methods and apparatus of power management of a computer processor and computer processors configured for such power management are disclosed in this specification. Such a computer processor may include a branch prediction unit, where the branch prediction unit includes a local branch predictor and a plurality of global branch predictors. In some embodiments, the global branch predictors include a Tagged Geometric ('TAGE') branch predictor. For each of a plurality of branch instructions, the computer processor may carry out: performing, by the local branch predictor, a local branch prediction; performing, by each of the global branch predictors, a global branch prediction; determining to utilize the local branch prediction over the global branch predictions as a branch prediction for the branch instruction; incrementing a value of a counter; determining whether the value of the counter exceeds a predetermined threshold; and if the value of the counter exceeds the predetermined threshold, powering down at least one of the global branch predictors and configuring the branch prediction unit to bypass the powered down global branch predictor for branch predictions of subsequent branch instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
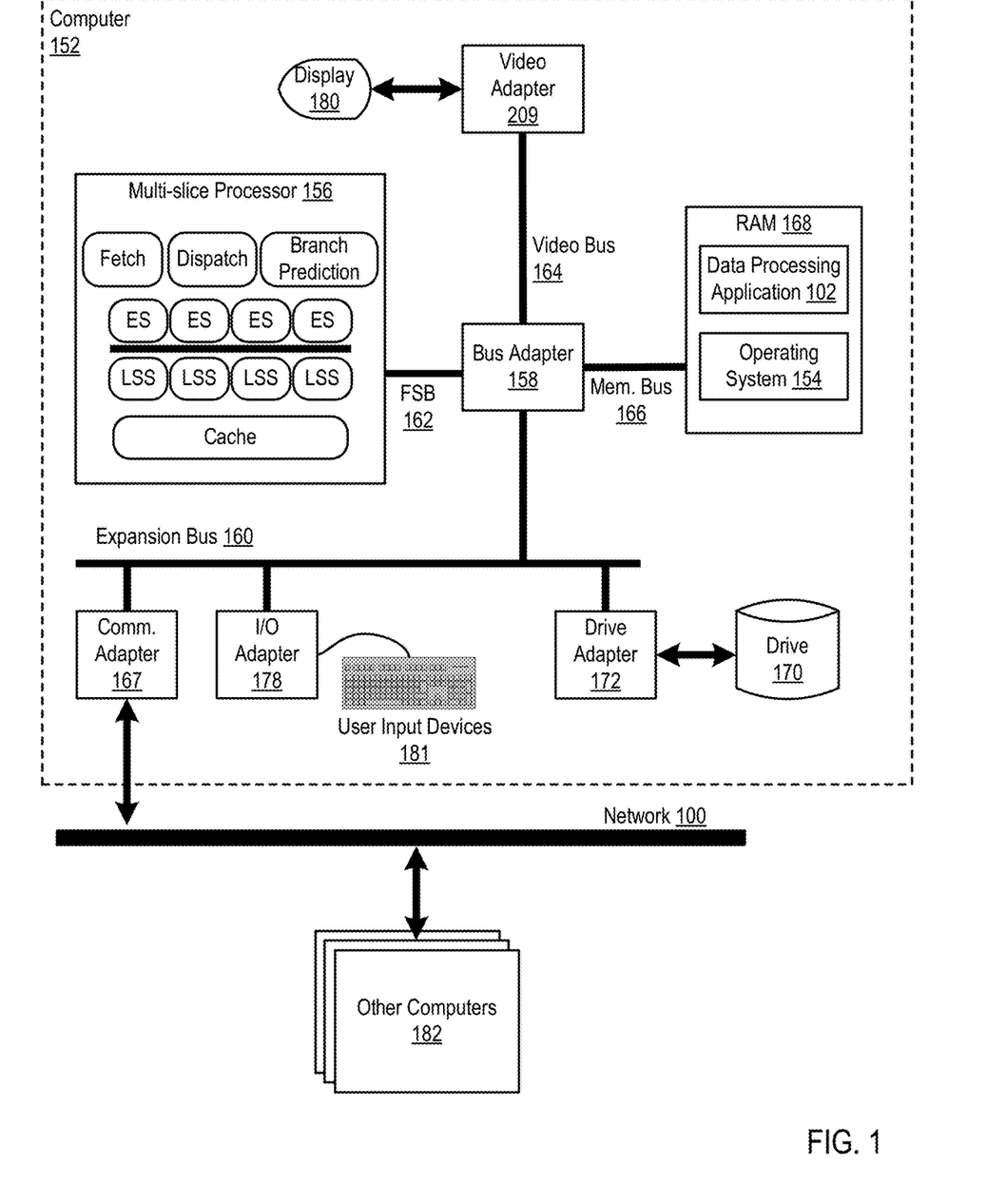
FIG. 1 sets forth a block diagram of an example system configured for branch prediction in a computer processor according to embodiments of the present invention.

Exemplary methods and apparatus for managing power consumption in a computer processor in accordance with the present invention are described with reference to the accompanying drawings, beginning with FIG. 1. FIG. 1 sets forth a block diagram of an example system configured for power management in a computer processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linus™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
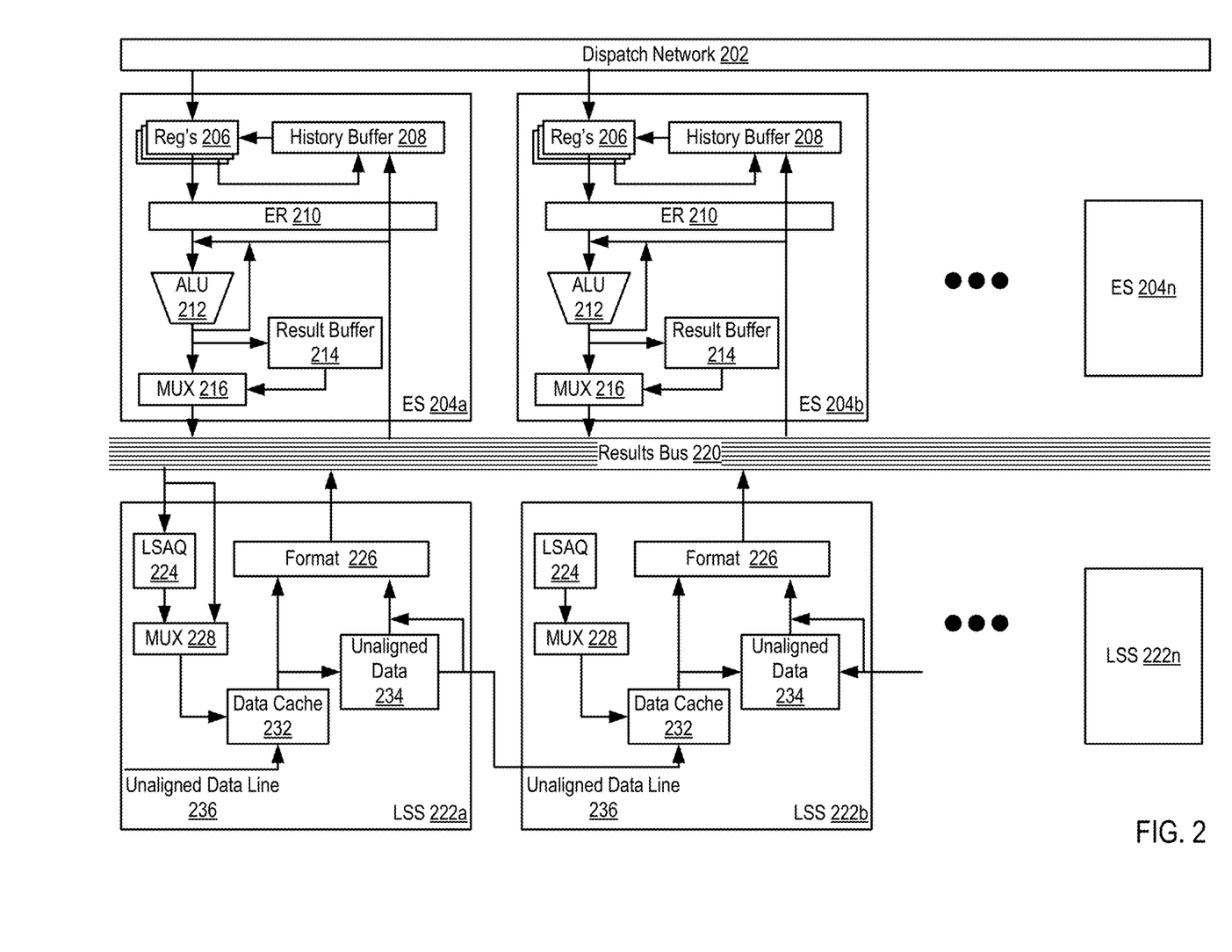
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of an architectural register that enables out-of-order execution of instructions that target the same architectural register.

When a younger instruction targeting the same particular logical register is received, the entry in the general purpose register is moved to the history buffer. The history buffer (208) may be configured to store many identifiers of instructions targeting the same logical register. That is, the general purpose register is generally configured to store a single, youngest instruction identifier for each logical register while the history buffer may store many identifiers of non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a, 222b-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
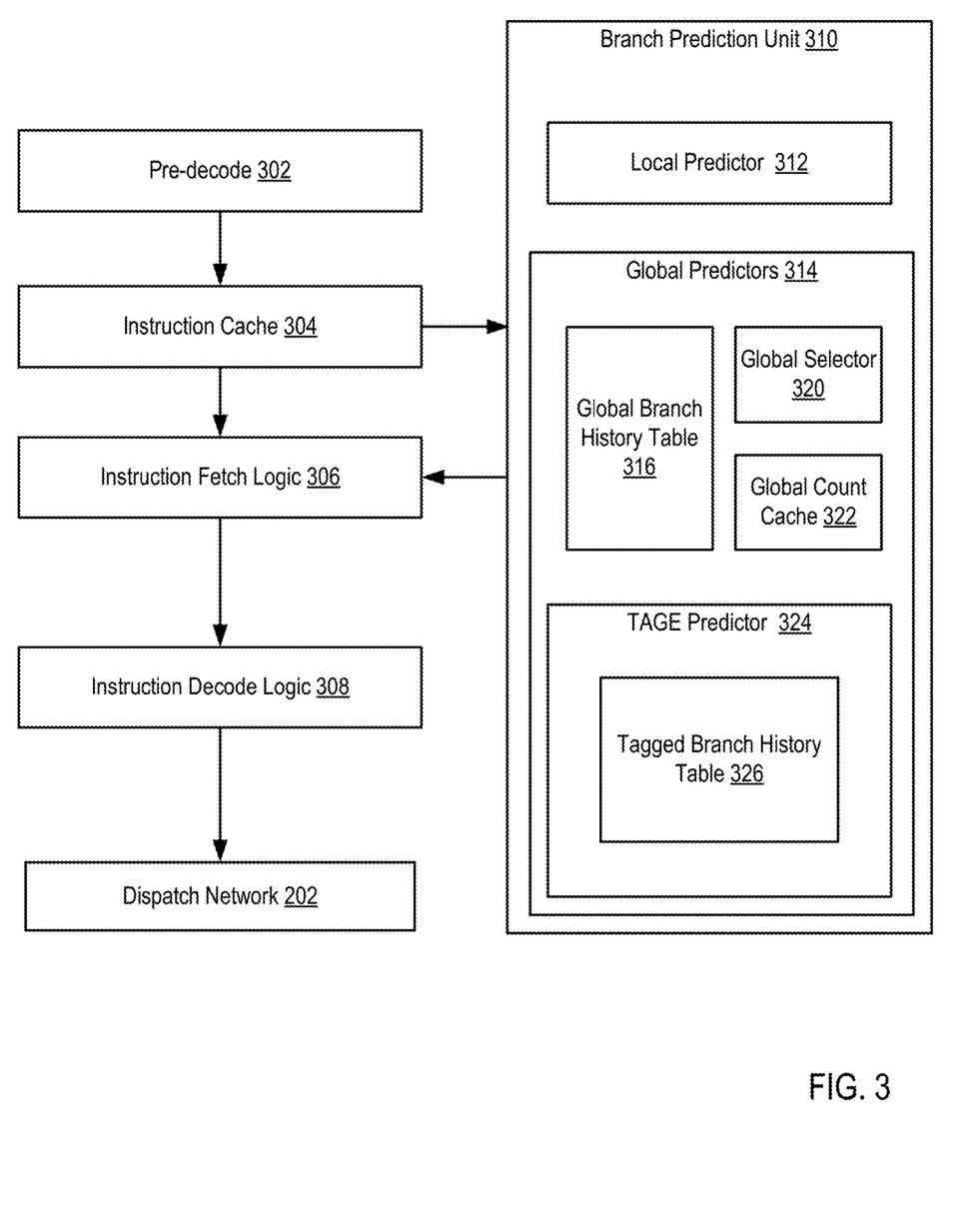
FIG. 3 sets forth a block diagram of another portion of a multi-slice processor according to embodiments of the present invention.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes a branch prediction unit (310). Branch prediction units generally perform branch prediction for pre-decoded instructions and track various branch prediction statistics for executing and executed instructions. The branch prediction unit (310) may include or access various registers and storage that contain such branch prediction statistics. Further, the branch prediction unit may include several types of predictors, or logic that provides a branch prediction. In the example of FIG. 3, the branch prediction unit (310) includes a local predictor (312), and several global predictors (314) including a TAGE ('Tagged Geometric') predictor (324). Each predictor may be configured to provide a branch prediction of increasing accuracy at the cost of power consumption, complexity of logic, size of history to store branch statistics, and time to calculate the prediction. The local predictor, for example, may be configured to make a prediction based solely on the address of the branch instruction. Such a prediction may be calculated quickly and may utilize fewer resources than a prediction calculated by the global branch predictors. Some of the global branch predictors (314), in the example of FIG. 3, may utilize, in addition to the branch address, a global history vector that is maintained during operation. Such a global history vector may be relatively short, 20 bits for example, containing the history of the last 20 branches. The branch address and global history vector may undergo an Exclusive OR (XOR) operation. The result of such operation may provide an index into a global branch history table (316). Such a global branch history table (316) may be configured to store statistics related to branch history for a plurality of branches. Further, a global selector (320) may be retrieved. The global selector (320) may indicate that the global branch predictor is to be utilized over the local branch prediction when the two do not match. Also, a global count cache (322) may be accessed for a global branch prediction. The global count cache maintains counters for relative branch instructions for use in determining how many instructions to jump when a branch prediction is made.

The TAGE predictor (324) likewise utilizes a tagged branch history table (326) which stores statistics on a plurality of branch instructions and each entry is tagged. In addition to the global history vector which may be relatively short, the TAGE may utilize a much longer global history buffer. Such a buffer may include 100 bits of branch history. Further, the TAGE is indexed by a tag that is instruction specific. While the TAGE predictor provides the greatest accuracy of the three types of predictors, the TAGE predictor requires a very large, and thus power consuming, set of arrays, to maintain the Tagged branch history table. As explained below, with respect to FIGS. 4-6, the multi-slice processor in the example of FIG. 3 may be configured to manage power consumption through control of various portions of the branch prediction unit.

Readers of skill in the art will recognize that the TAGE predictor (324) depicted in FIG. 3 is but one example of a global TAGE predictor which may be implemented in the processor of FIG. 3. As mentioned above, some TAGE predictors may utilize a long, 100 bit branch history to perform branch predictors. Some TAGE predictors, however, may utilize a much shorter 20-bit global history vector. In such an embodiment, those that use shorter global history vector may be powered down when before the longer TAGE predictors when managing power consumption as set forth below.

The example multi-slice processor of FIG. 3 also includes an instruction fetch unit (306). An instruction fetch unit (306) generally retrieves instructions from the instruction cache and provides the fetched instruction to instruction decode logic (308).

The example instruction decode logic (308) of FIG. 3 performs a final decode operation on the fetched instructions and provides the decoded instructions to the dispatch network (202). The dispatch network as described above, dispatches the decoded instructions among slices.

Figure 4:
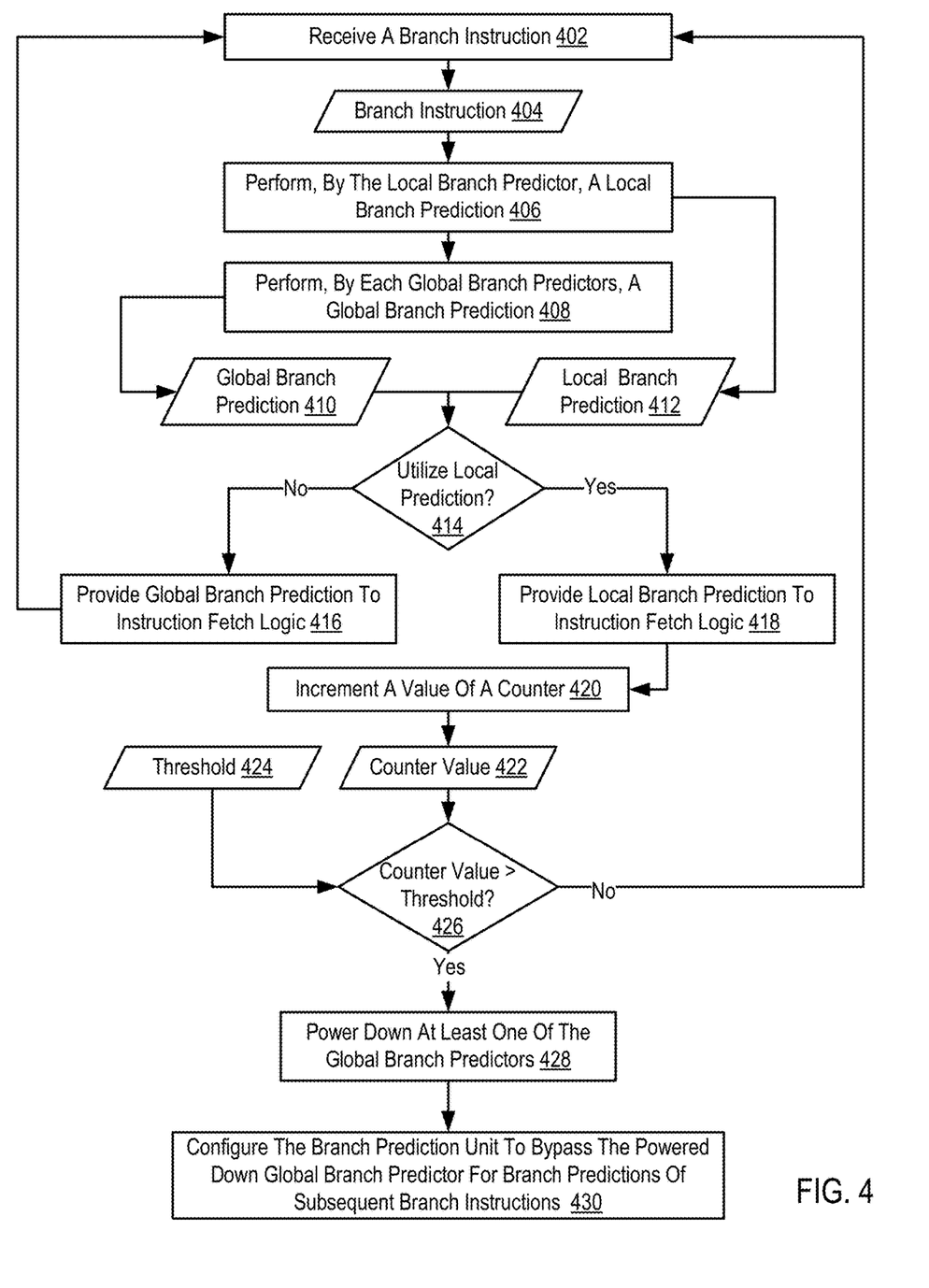
FIG. 4 sets forth a flow chart illustrating an exemplary method for branch prediction in a computer processor.

For further explanation, FIG. 4 sets forth a flow chart illustrating an exemplary method for power management in a computer processor, such as the multi-slice processor in the example of FIG. 2 and FIG. 3. Such a computer processor includes a branch prediction unit which in turn includes a local branch predictor and a plurality of global branch predictors. A local branch predictor comprises logic, circuitry, and storage configured for calculation of a local branch prediction. A global branch predictor comprises logic, circuitry, and storage configured for calculation of a global branch prediction.

The method of FIG. 4 includes receiving (402), by the branch prediction unit, a branch instruction (404). Receiving (402) a branch instruction (404) may be carried out in a variety of ways. In some embodiments, pre-decode logic is configured to provide such branch instructions to the branch prediction unit. In other embodiments, the branch prediction unit may be configured to monitor an instruction cache for newly added branch instructions.

The method of FIG. 4 also includes performing (406), by the local branch predictor, a local branch prediction and performing (408), by the global branch predictors, a global branch prediction. As explained above, performing a local branch prediction may be carried out utilizing the branch address of the branch instruction, while a global branch prediction may be performed by XORing the branch address with a 20-bit history vector, and a global branch prediction in the form of a TAGE prediction may be carried out utilizing a 100-bit history buffer as well as a TAG that uniquely identifies the branch instruction. Additionally, the local and global branch predictors may make use of a cache of counters where each counter indicates a number of instructions to jump to in the case of a predicted taken relative branch.

The method of FIG. 4 includes determining (414) whether to utilize the local branch prediction (412) over the global branch predictions (410) as a branch prediction for the branch instruction. Each global branch prediction may include as a result of the prediction, a selector that indicates whether to utilize the global branch prediction instead of the local branch prediction. Thus, to determine whether to utilize the local or global, the branch prediction unit inspects the value of the selector as retrieved from the global branch predictions.

If the branch prediction unit determines to utilize the global branch prediction, the method of FIG. 4 continues by providing (416) the global branch prediction (410) to instruction fetch logic. Such a prediction will be utilized by the instruction fetch unit if the branch prediction is taken. If, however, the branch prediction unit determines to utilize the local prediction, the method of FIG. 4 continues by providing (418) the local branch prediction (412) to the instruction fetch unit.

In some instances, an instruction stream may include many repetitions of the same set of instructions. Further, such instructions may include one or more branch instructions that are easily predicted by the local branch predictors. In such a case, power is needlessly consumed by the global branch predictor arrays (storage) and other logic.

To that end, the method of FIG. 4 also includes incrementing (420) a value (422) of a counter. That is, upon each use of the local branch predictor over a global branch predictor, the branch prediction unit increases the counter value. In effect, the branch prediction unit counts the number of local branch predictions utilized over time. Such a counter may be maintained within or as logic separate from the branch prediction unit.

The method of FIG. 4 also includes determining (426) whether the value (422) of the counter exceeds a predetermined threshold (424). The predetermined threshold may be user specified or defined in the architecture of the processor. In some embodiments, the predetermined threshold may be 63, where the counter is initialized at 0, such that 64 local branch predictions are made prior to the counter exceeding the predetermined threshold.

If the counter value (422) does not exceed the predetermined threshold, the method of FIG. 4 continues by repeating the process upon receipt of a subsequent branch instruction. If the value (422) of the counter exceeds the predetermined threshold (424) the method of FIG. 4 continues by powering down (428) at least one of the global branch predictors and configuring (430) the branch prediction unit to bypass the powered down global branch predictor for branch predictions of subsequent branch instructions.

Powering down (428) at lease one of the global branch predictors may be carried out in various ways. In some embodiments, for example, powering down (428) at least one of the global branch predictors may be carried out by prohibiting clocking of a global branch history table, a global selector, and a global count cache. In this way, subsequent branch instructions will utilize only the non-powered down branch predictors and the powered-down global branch predictor will not consume power. Such a mode of operation may be referred to as a "local good mode." In such a mode, the powered-down branch predictors are not utilized to make branch predictions. Another mode, described below is a "local very good mode" in which only the local branch predictor is used and all global branch predictors are powered down.

Figure 5:
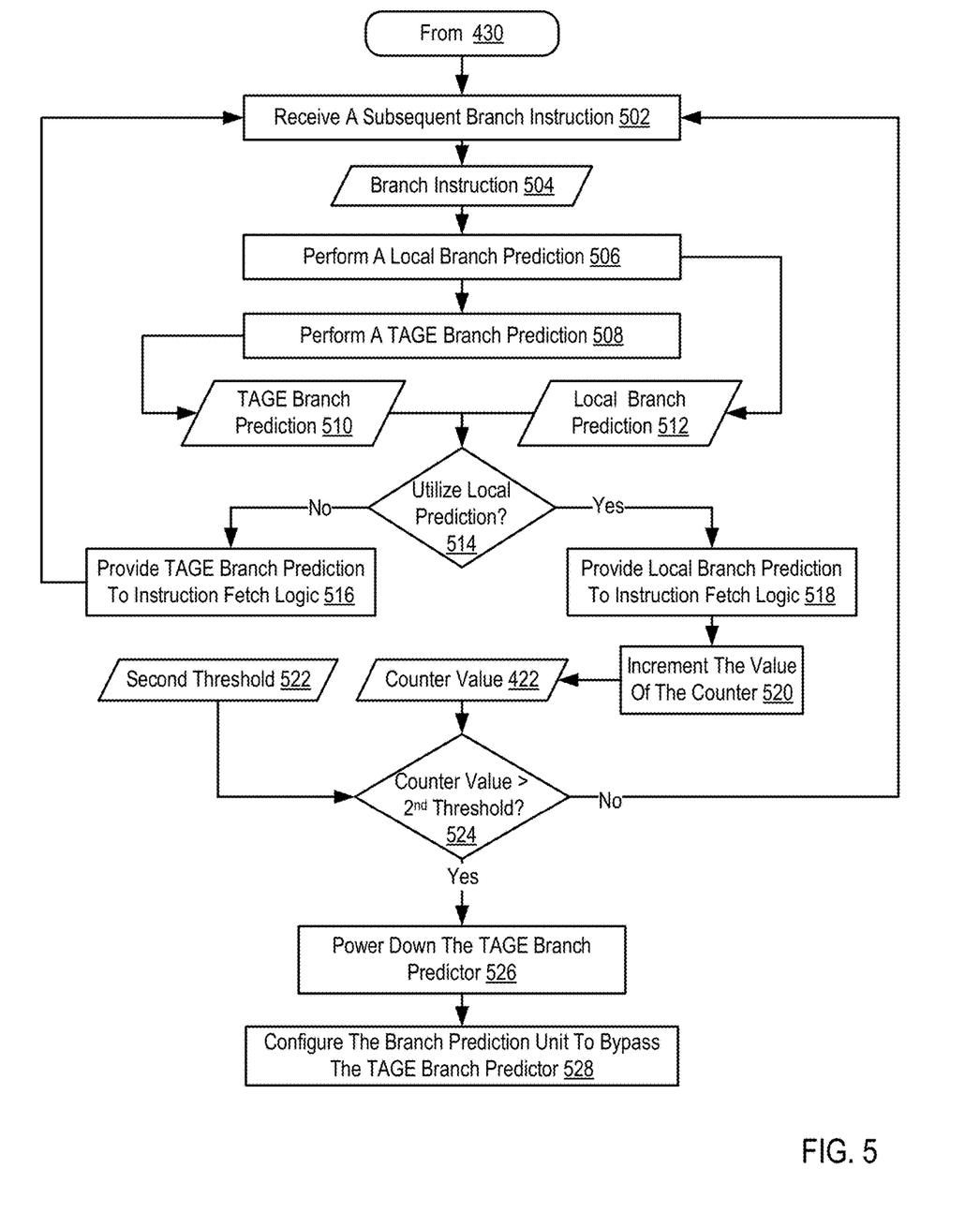
FIG. 5 sets forth a flow chart illustrating a further exemplary method for branch prediction in a computer processor.

For further explanation, FIG. 5 sets forth a flow chart illustrating an exemplary method for power management in a computer processor in which at least one global branch predictor is powered down, but a global branch predictor in the form of a TAGE branch predictor has not yet been powered down.

TAGE prediction allows entries of a branch history table to be individually addressable through the use of a tag (or identifier). The TAGE predictor may include multiple paths that each use history vectors of differing lengths that form a geometric series. This may enable branch predictions to be based upon correlations that exist with recent branch outcomes as well as with older branch outcomes of a particular branch instruction.

In some embodiments, as mentioned above, the TAGE branch predictor may utilize a much longer branch history as well as a TAG to perform a branch predictor. After a global branch predictor other than the TAGE has been powered down, it may be useful to maintain the TAGE predictions for some time to ensure that the current pattern of branch instructions which lend well to local prediction continues. The TAGE branch prediction, utilizing such a long history relative to other global branch predictors, increases the probability that the pattern of branch instructions will continue. As such, it may be useful in some instances to keep the global, TAGE branch predictor powered on while other global branch predictors that utilize less history are powered down.

Such a prediction, while likely more accurate than a local or global branch prediction, may be more time consuming than either or more power consuming. To that end, the method of FIG. 5 generally sets forth a method to power down the TAGE predictor after other global branch predictors have been powered down as seen in FIG. 4.

As such, the method of FIG. 5 begins from step (430) of FIG. 4. That is, only after the other global branch predictors have been powered down and the branch prediction unit has been configured to prohibit branch predictions from the powered down global branch predictors does the method of FIG. 5 begin.

The method of FIG. 5 includes receiving (502) a subsequent branch instruction (504). The term 'subsequent' here refers to a branch instruction received after the other, non-TAGE, global branch predictors have been powered down in FIG. 4.

The method of FIG. 5 also includes performing (506) a local branch prediction (512) and a performing (508) a TAGE (510) branch prediction (510). Again, as noted above, the local branch prediction requires far less power consumption than the TAGE branch prediction.

The method of FIG. 5 continues by determining (514) whether to utilize the local branch prediction (512) over the TAGE branch prediction (510) for the subsequent branch instruction. If the branch prediction unit determines to utilize the TAGE branch prediction, the method of FIG. 5 continues by providing (516), to the instruction fetch logic, the TAGE branch prediction (510). If, however, the branch prediction unit determines to utilize the local branch prediction (512) over the TAGE prediction, the method of FIG. 5 continues by providing (518) the local branch prediction (512) to the instruction fetch logic and incrementing (520) the value of the counter.

In some embodiments, the counter in the method of FIG. 5 is the same as the counter in the method of FIG. 4. The value of which was previously set in FIG. 4 when the branch prediction unit incremented the counter past the predetermined threshold. That is, for example, the branch prediction unit, when determining to utilize the local branch prediction in the method of FIG. 4, incremented the counter value past the predetermined value of 63 to a value of 64. In the present method, the branch prediction unit, on the first branch instruction received after powering down the global branch predictor and after determining to utilize a local branch prediction for the branch instruction rather than the TAGE branch prediction, increments the value of the counter from 64 to 65.

The method of FIG. 5 also includes determining (524) whether the value (422) of the counter exceeds a second predetermined threshold (522). The second predetermined threshold may be greater than the first. In some embodiments, for example, the first predetermined threshold is 63 while the second predetermined threshold is 127.

If the value (422) of the counter exceeds the second predetermined threshold (522), the method of FIG. 5 continues by powering down (526)\the TAGE branch predictor and configuring (528) the branch prediction unit to bypass the TAGE branch predictor for branch predictions of subsequent branch instructions. Powering down (526) the TAGE branch predictor may be carried out by prohibiting clocking of logic, arrays, and other circuitry of the TAGE branch predictor.

Once all global branch predictors have been powered down, including the TAGE branch predictor, the processor is said to be operating in a "local very good" mode of operation. In such a mode, it is highly likely that the local branch predictor will provide accurate branch prediction for many subsequent branch instructions and all global branch predictors are no longer consuming power.

At some point, however, the computer instruction stream may change so that the branches are no longer easy to calculate with local branch prediction. To that end, the method of FIG. 6 sets forth a flow chart illustrating another exemplary method for power management in a computer processor. The method of FIG. 6 is similar to the method of FIG. 4 including, as it does receiving (402) a branch instruction; performing (406) a local branch prediction; performing (408) a global branch prediction; determining (414) to utilize the local branch prediction over the global branch prediction as a branch prediction for the branch instruction; incrementing (420) a value of a counter; determining (426) that the value (422) of the counter exceeds a predetermined threshold (424); powering down (428) at least one of the global branch predictors and configuring (430) the branch prediction unit to bypass the powered down global branch predictor for branch predictions of subsequent branch instructions.

Figure 6:
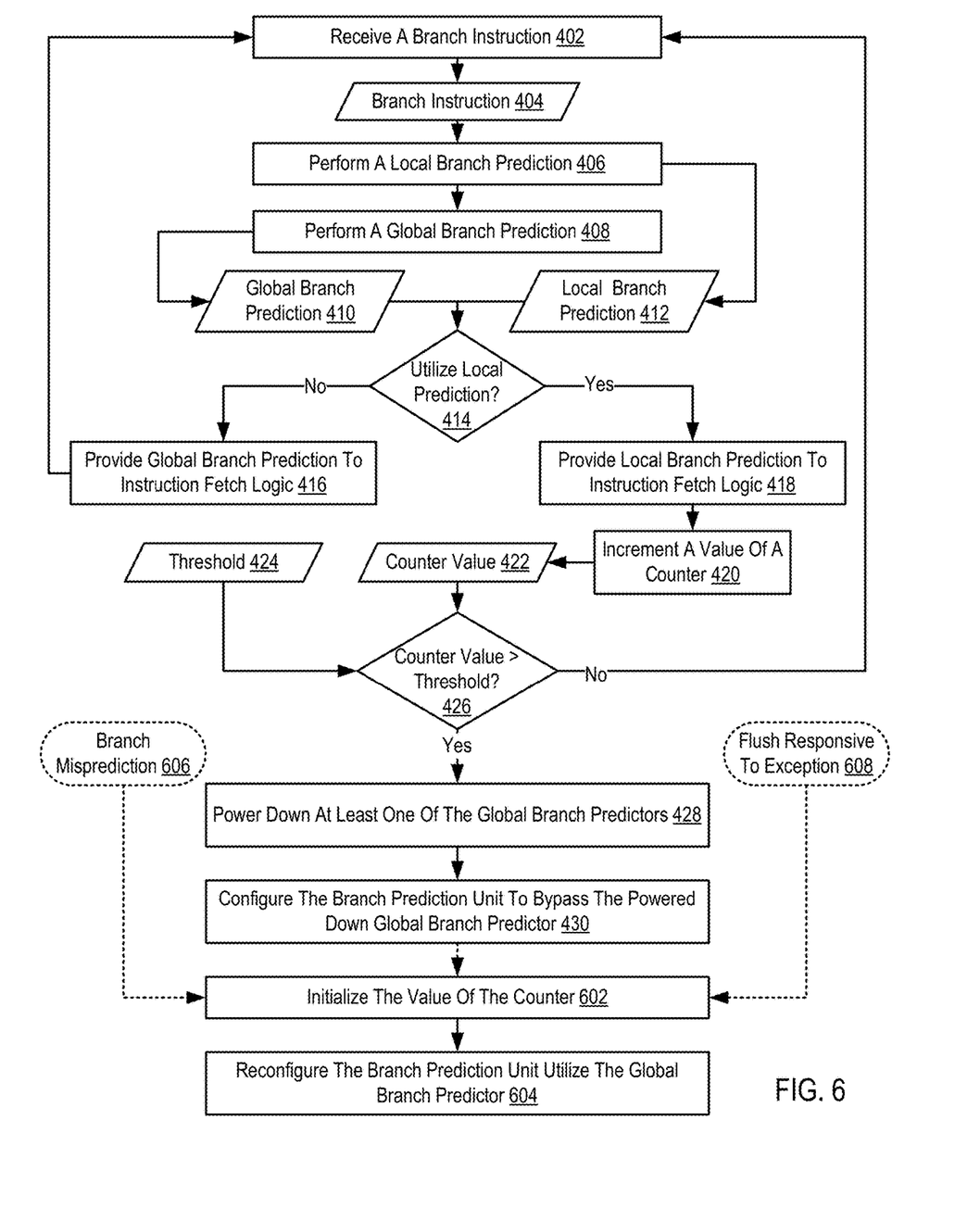
FIG. 6 sets forth a flow chart illustrating a further exemplary method for branch prediction in a computer processor.

The method of FIG. 6 differs from the method of FIG. 4, however, in that the method of FIG. 4 includes initializing (602) the value of the counter and if the branch prediction unit has been configured to bypass the global branch predictor, reconfiguring (604) the branch prediction unit utilize the global branch predictor. Such a reconfiguration may include powering up the previously powered down global branch predictors.

In some embodiments such initialization (602) of the counter value (422) and reconfiguration (604) of the global branch predictors may be carried out upon a branch misprediction (606). The misprediction is an indication that the set of instructions being executed may not repeat in the same fashion as before and thus, the global branch predictions may be necessary to more accurately calculate branch predictions.

In some embodiments, an exception in instruction execution may cause a flush (608). Responsive to such a flush, the branch prediction unit may initialize the counter value (422) and reconfigure (604) the global branch predictors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of power management in a computer processor, the computer processor comprising a branch prediction unit, the branch prediction unit comprising a local branch predictor and a plurality of global branch predictors, the method comprising:
   for each of a plurality of branch instructions:
   performing, by the local branch predictor, a local branch prediction;
   performing, by each of the global branch predictors, a global branch prediction;
   determining to utilize the local branch prediction over the global branch predictions as a branch prediction for the branch instruction;
   incrementing, upon each use of the local branch predictor over the global branch predictor, in response to determining to utilize the local branch prediction over the global branch predictions as the branch prediction for the branch instruction, a value of a counter of a number of local branch predictions utilized over a period of time;
   determining whether the value of the counter of the number of local branch predictions utilized over the period of time exceeds a predetermined threshold; and
   if the value of the counter of the number of local branch predictions utilized over the period of time exceeds the predetermined threshold, powering down at least one of the global branch predictors and configuring the branch prediction unit to bypass the powered down global branch predictor for branch predictions of subsequent branch instructions.

2. The method of claim 1, wherein:
   powering down at least one of the global branch predictors further comprises prohibiting clocking of a global branch history table, a global selector, and a global count cache.

3. The method of claim 1, wherein, responsive to a branch misprediction:

initializing the value of the counter; and if the branch prediction unit has been configured to bypass at least one global branch predictor, reconfiguring the branch prediction unit utilize the global branch predictor.

4. The method of claim 1, wherein, responsive to a flush initiated responsive to an exception:
initializing the value of the counter; and if the branch prediction unit has been configured to bypass at least one global branch predictor, reconfiguring the branch prediction unit utilize the global branch predictor.

5. The method of claim 1, wherein, performing a local branch prediction further comprises performing a branch prediction in dependence upon an address of the branch instruction.

6. The method of claim 1, wherein, performing a global branch prediction further comprises performing a branch prediction in dependence upon a global history vector and the address of the branch instruction.

7. The method of claim 6, wherein, performing the global branch prediction further comprises performing a TAGE branch prediction in dependence upon the global history vector, a global history buffer, and at tag of the branch instruction.

8. A computer system comprising a computer processor, the computer processor comprising a branch prediction unit, the branch prediction unit comprising a local branch predictor and a plurality of global branch predictors, the computer processor configured to carry out, for each of a plurality of branch instructions:
performing, by the local branch predictor, a local branch prediction;
performing, by each of the global branch predictors, a global branch prediction;
determining to utilize the local branch prediction over the global branch predictions as a branch prediction for the branch instruction;
incrementing, upon each use of the local branch predictor over the global branch predictor, in response to determining to utilize the local branch prediction over the global branch predictions as the branch prediction for the branch instruction, a value of a counter of a number of local branch predictions utilized over a period of time;
determining whether the value of the counter of the number of local branch predictions utilized over the period of time exceeds a predetermined threshold; and
if the value of the counter of the number of local branch predictions utilized over the period of time exceeds the predetermined threshold, powering down at least one of the global branch predictors and configuring the branch prediction unit to bypass the powered down global branch predictor for branch predictions of subsequent branch instructions.

9. The computer system of claim 8, wherein:
powering down at least one of the global branch predictors further comprises prohibiting clocking of a global branch history table, a global selector, and a global count cache.

10. The computer system of claim 8, wherein, responsive to a branch misprediction:
initializing the value of the counter; and if the branch prediction unit has been configured to bypass at least one global branch predictor, reconfiguring the branch prediction unit utilize the global branch predictor.

11. The computer system of claim 8, wherein, responsive to a flush initiated responsive to an exception:
initializing the value of the counter; and if the branch prediction unit has been configured to bypass at least one global branch predictor, reconfiguring the branch prediction unit utilize the global branch predictor.

12. The computer system of claim 8, wherein, performing a local branch prediction further comprises performing a branch prediction in dependence upon an address of the branch instruction.

13. The computer system of claim 8, wherein, performing a global branch prediction further comprises performing a branch prediction in dependence upon a global history vector and the address of the branch instruction.

14. The computer system of claim 13, wherein, performing the global branch prediction further comprises performing a TAGE branch prediction in dependence upon the global history vector, a global history buffer, and at tag of the branch instruction.

15. A computer processor comprising:
a branch prediction unit, the branch prediction unit comprising a local branch predictor and a plurality of global branch predictors, the computer processor configured to carry out, for each of a plurality of branch instructions:
performing, by the local branch predictor, a local branch prediction;
performing, by each of the global branch predictors, a global branch prediction;
determining to utilize the local branch prediction over the global branch predictions as a branch prediction for the branch instruction;
incrementing, upon each use of the local branch predictor over the global branch predictor, in response to determining to utilize the local branch prediction over the global branch predictions as the branch prediction for the branch instruction, a value of a counter of a number of local branch predictions utilized over a period of time;
determining whether the value of the counter of the number of local branch predictions utilized over the period of time exceeds a predetermined threshold; and
if the value of the counter of the number of local branch predictions utilized over the period of time exceeds the predetermined threshold, powering down at least one of the global branch predictors and configuring the branch prediction unit to bypass the powered down global branch predictor for branch predictions of subsequent branch instructions.

16. The computer processor of claim 15, wherein:
powering down at least one of the global branch predictors further comprises prohibiting clocking of a global branch history table, a global selector, and a global count cache.

17. The computer processor of claim 15, wherein, responsive to a branch misprediction:
initializing the value of the counter; and if the branch prediction unit has been configured to bypass at least one global branch predictor, reconfiguring the branch prediction unit utilize the global branch predictor.

* * * * *